US006896147B2

(12) United States Patent
Trude

(10) Patent No.: US 6,896,147 B2
(45) Date of Patent: May 24, 2005

(54) BASE STRUCTURE FOR A CONTAINER

(75) Inventor: Greg Trude, Seven Valleys, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 10/366,574

(22) Filed: Feb. 14, 2003

(65) Prior Publication Data
US 2004/0159626 A1 Aug. 19, 2004

(51) Int. Cl.$^7$ .............................. B65D 1/02; B65D 1/42; B65D 23/00
(52) U.S. Cl. ...................... 215/373; 215/10; 215/371; 206/509; 220/606; 220/608
(58) Field of Search ................ 215/371, 373, 215/10; 220/606, 608; 206/509

(56) References Cited

U.S. PATENT DOCUMENTS

| | | | | |
|---|---|---|---|---|
| 3,001,564 A | * | 9/1961 | Hopkins ................ 206/508 |
| 3,050,773 A | * | 8/1962 | Hagen .................. 264/534 |
| 3,485,355 A | * | 12/1969 | Stewart ................ 206/509 |
| 3,733,309 A | * | 5/1973 | Wyeth et al. ......... 428/36.92 |
| 3,870,181 A | * | 3/1975 | Sincock ............... 215/373 |
| 4,108,324 A | | 8/1978 | Krishnakumar et al. |
| 4,134,510 A | | 1/1979 | Chang |
| 4,231,483 A | * | 11/1980 | Dechenne et al. ..... 220/608 |
| 4,249,666 A | * | 2/1981 | Hubert et al. ......... 215/373 |
| 4,342,398 A | * | 8/1982 | Chang ................. 215/373 |
| 4,381,061 A | * | 4/1983 | Cerny et al. .......... 220/62.11 |
| 4,465,199 A | * | 8/1984 | Aoki .................. 215/373 |
| 4,515,284 A | * | 5/1985 | Lee et al. ............ 220/606 |
| 4,598,831 A | * | 7/1986 | Nakamura et al. ..... 215/373 |
| 4,894,268 A | * | 1/1990 | Greenwood et al. .... 428/36.92 |
| 4,997,692 A | * | 3/1991 | Yoshino ............... 428/36.92 |
| 5,005,716 A | | 4/1991 | Eberle |
| 5,071,015 A | | 12/1991 | Kinslow |
| 5,092,474 A | * | 3/1992 | Leigner ............... 215/381 |
| 5,236,097 A | | 8/1993 | Behm et al. |
| 5,503,283 A | | 4/1996 | Semersky |
| 5,713,480 A | * | 2/1998 | Petre et al. .......... 215/373 |
| 6,045,001 A | | 4/2000 | Seul |
| 6,176,382 B1 | * | 1/2001 | Bazlur Rashid ....... 215/373 |
| 6,277,321 B1 | * | 8/2001 | Vailliencourt et al. ... 264/529 |
| 6,299,007 B1 | * | 10/2001 | Takeuchi ............. 215/373 |
| 6,409,035 B1 | | 6/2002 | Darr et al. |
| 6,585,123 B1 | * | 7/2003 | Pedmo et al. ......... 215/10 |
| 6,612,451 B2 | * | 9/2003 | Tobias et al. ......... 215/375 |
| 2003/0116525 A1 | * | 6/2003 | Futral et al. |

FOREIGN PATENT DOCUMENTS

WO  WO9206897  *  4/1992  ............... 206/509

* cited by examiner

Primary Examiner—Sue A. Weaver
(74) Attorney, Agent, or Firm—Venable; James Burdett; Jeffri Kaminski

(57) ABSTRACT

A base structure for a blow-molded container having a sidewall is provided. The base structure comprises a support heel having an outer portion and an inner portion, the outer portion merging with the container sidewall. An inner projecting portion merges with the inner portion of the support heel. The inner projecting portion is inclined at an angle of at least about 50 degrees.

23 Claims, 4 Drawing Sheets

BASE STRUCTURE FOR A CONTAINER

BACKGROUND OF THE INVENTION

1. Field of the Invention

The present invention relates generally to a base structure and more particularly to a base structure for a blow molded container with enhanced structural integrity and simplified geometry.

2. Related Art

Many products are sold to the consuming public in plastic containers such as are shown in U.S. Pat. Nos. 5,005,716 (Eberle); 4,108,324 (Krishnakumer et al); and 4,134,510 (Chang). The design of plastic containers must take into account the container's structural integrity, the manufacturing cost to mass produce the container, and the aesthetic appearance of the container to the eye of the consumer.

A hot-fillable plastic container must be structurally sound to withstand various forces relating to the so-called "hot-fill" process. Moreover, it must withstand rough handling during transportation to the ultimate consumer. A "hot-fill" process is the procedure by which containers are filled with a substance at a high temperature after which the containers are capped. As the substance cools within the container, stresses and strains develop in the container due to changes in the volume of the contents. Containers that store products under pressure, such as carbonated beverages, also experience pressure changes due to changes in ambient temperature. A commercially satisfactory container structure must not only withstand these forces from a structural viewpoint, but must also present an aesthetically pleasing appearance to the ultimate consumer.

The price of many products sold to the consuming public is affected to an extent by the cost of packaging. With plastic containers, the cost of manufacturing a container is affected by the cost of plastic composing the container. Therefore, if the amount of plastic in a container can be reduced, the cost of manufacturing the container can be reduced commensurately. However, in achieving this goal it is known that the thinner the walls and base of the container become, the greater the need to utilize imaginative designs to provide a container that is commercially acceptable.

The desire to decrease the amount of plastics used in a container has resulted in the development of different techniques to design containers that have structural integrity with minimal use of plastic. It is known that shape and location of structural elements such as ribs, hinges, panels, and the like can affect the container's overall structural integrity. While various structural elements molded in the side panel and base structure can afford structural integrity, they must also be visually appealing to the consumer and not impede the removal of a product from the container.

Krishnakumer et al. ('324) illustrate a rounded container base structure which employs various structural elements molded into the base which enhances structural integrity. This base design has a series of radially extending ribs which allow the base structure to withstand a variety of applied forces and which minimizes the use of plastic.

Eberle ('716) disclose a round base structure having a central concavity and a convex heel. The heel surrounds the concavity and merges therewith and with the container sidewall. A plurality of hollow convex ribs, distributed in a symmetrical array, interrupt the outer surface of the concavity and merge smoothly therewith, each rib extending longitudinally in the direction of the heel and downwardly from an inner portion of the concavity. The wall of the bottom structure generally decreases in thickness progressively from the innermost point of the concavity to the sidewall. The structure allows the base to withstand the various stresses and strains applied to the container and also minimizes the use of plastic.

Chang ('510) show a round base which employs a series of circumferential ribs in combination with radial ribs to provide the desired degree of structural integrity. The radial ribs intersect all of the circumferential ribs. The various ribs are solid.

Accordingly, as described above, prior base structures for blow molded containers usually include horizontal or vertical annular sections or ribs', to provide stiffness and increase structural support. These additional support structures create crevices and recesses in the interior of the container. When the container is used to store a viscous substance, such as jelly, jam, preserves or heavy syrup, the viscous substance may become trapped in these crevices and recesses. In these instances, a consumer may have difficulty accessing and removing the substance from the container.

Although the aforementioned containers and base structures may function satisfactorily for their intended purposes, there remains a continuing need for a blow-molded plastic container having a base structure which has a simplified geometry for facilitating removal of a substance from the container, while enhancing container structural integrity. Also, these base structures need to be aesthetically pleasing and be capable of being manufactured in conventional high speed equipment.

BRIEF SUMMARY OF THE INVENTION

In an exemplary embodiment of the invention, a base structure for a blow-molded container having a sidewall is provided. The base structure comprises a support heel having an outer portion and an inner portion, the outer portion merging with the container sidewall. An inner projecting portion merges with the inner portion of the support heel. The inner projecting portion is pushed up towards the body and is inclined at an angle of at least about 50 degrees In another embodiment of the invention, a container comprises a hollow body portion having a longitudinal axis and a top portion with a finish extending upwardly from the body portion. An enclosed base portion includes an outer wall merging with the body portion opposite from the top portion and an inner wall merging with the outer wall to form a support surface. The inner wall includes a smooth inclined surface projecting inwardly towards the body portion and forming an interior angle of at least about 40 degrees with respect to a plane perpendicular to the longitudinal axis.

In another embodiment, a base structure for a container having a sidewall is provided The base structure comprises a support heel having an outer portion and an inner portion. The outer portion merges with the container sidewall. An inner projecting portion merges with the inner portion of the support heel. The inner projecting portion comprises a truncated cone, the cone being formed at an angle adapted to minimize a diameter of an amorphous ring of material formed therein.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. All references cited herein are incorporated by reference as if each had been individually incorporated.

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 1:
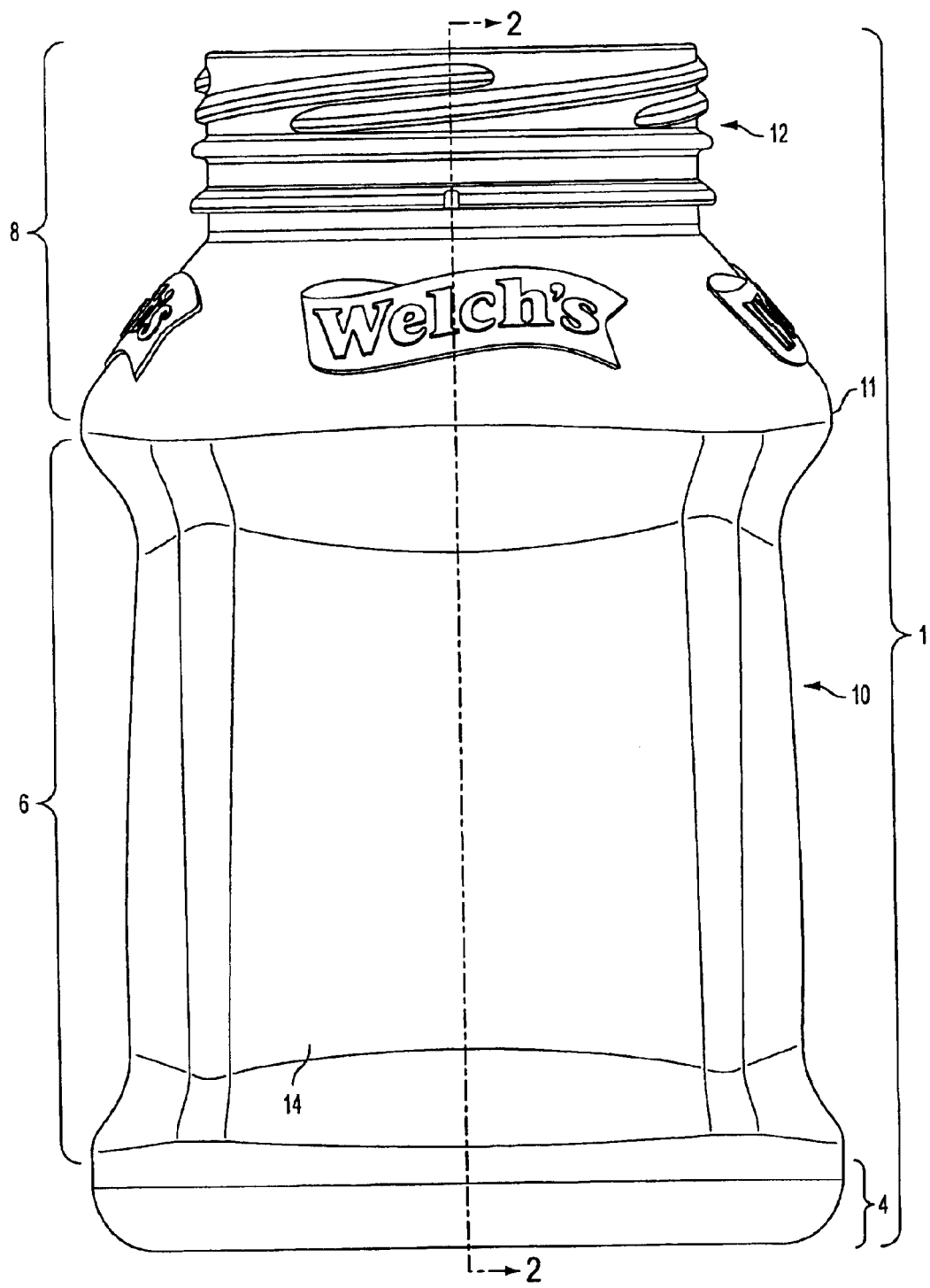
FIG. 1 is a side view of a container including a base structure according to an exemplary embodiment of the present invention.

Referring now to the drawings, FIG. 1 illustrates a blow-molded plastic container 1 such as may be used in the sale of jelly, jam and preserves. Such containers can typically be designed to contain liquid volumes of a one-half gallon, 32 ounces, or the like. The container 1 comprises a base 4 for supporting the container 1. The container 1 has a longitudinal axis 100 when the container 1 is standing upright on its base 4. A hollow body 6 extends upwardly from the base 4.

A top portion 8 finishes upwardly from the body 6 and may include a threaded neck 12 for filling and dispensing. Neck 12 also is sealable with a cap (not shown). The preferred container further comprises a shoulder 11 located below neck 12 and above body 6. The body 6 is defined by roughly rectangular sides 14 that connect shoulder 11 and base 4 and has a rectangular cross-section. Of course, the body may have other shapes. The sides 14 of the preferred container may include at least one label mounting area. A label or labels can be applied to one or more of the label mounting areas using methods that are well known to those skilled in the art, including shrink wrap labeling and adhesive methods. As applied, the label extends either around the entire body of the container or extends over the entirety or a portion of the label mounting area.

The container 1 is preferably a pressure-adjustable container, in particular a 'hot-fill' container that is adapted to be filled with a substance at a temperature above room temperature. The container 1 may be formed in a blow mold and may be produced from a polyester or other plastic material, such as a heat set polyethylene terephthalate (PET). The cap (not shown) seals the container and confines the substance inside the container.

When used in a hot-fill processing, the container is filled with a substance at an elevated temperature. The cap is then installed on the container neck. As the temperature of the substance and air decreases to ambient temperatures, its volume decreases. The container and its base structure must react to the reduction in volume and accommodate the stresses and strains while remaining structurally sound. Moreover, the base must also be capable of withstanding various other forces, such as changes in internal pressure, and the usual handling forces.

Figure 2:
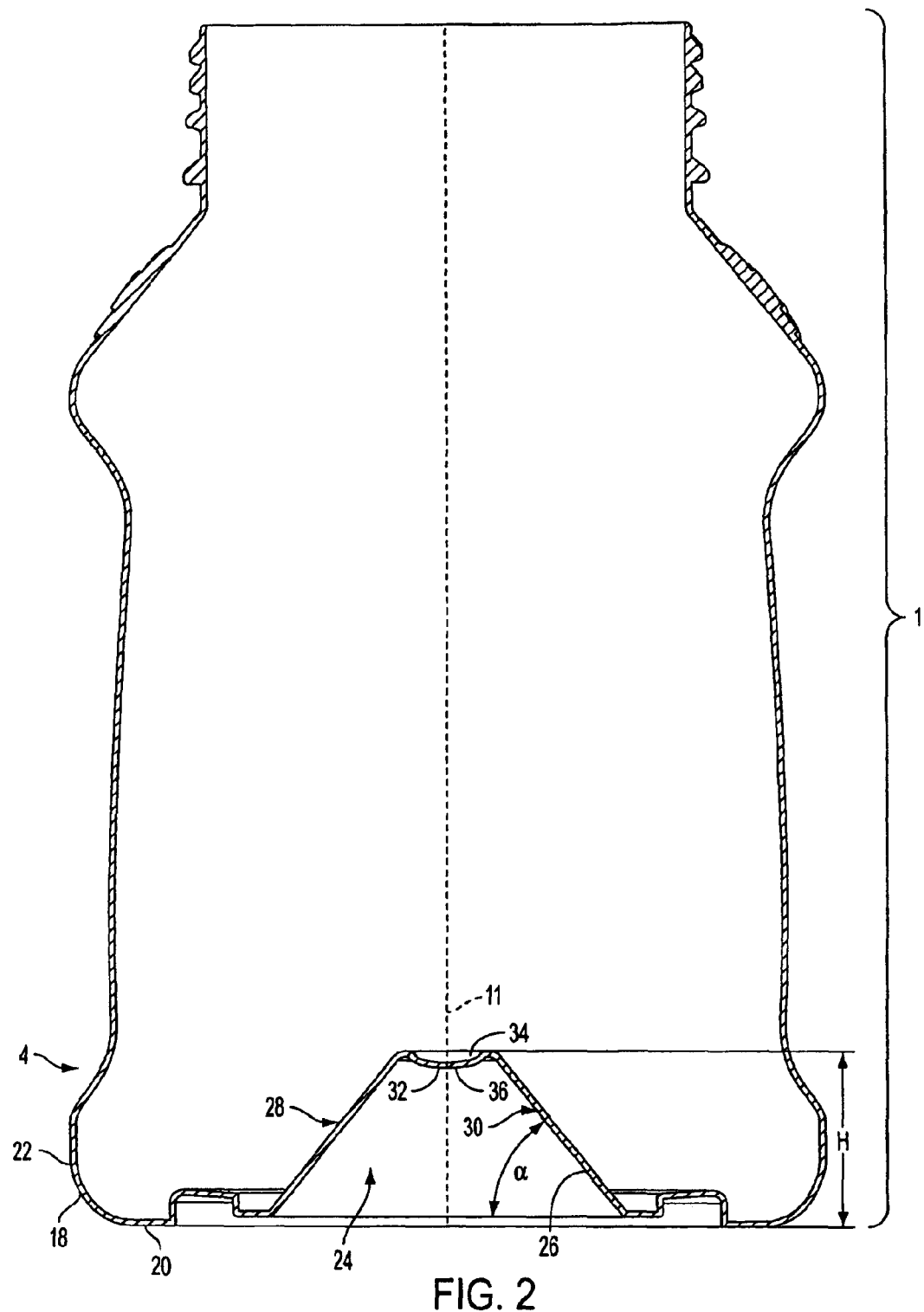
FIG. 2 is a cross-section view taken along line 2—2 of FIG. 1 of a container including a base structure according to an exemplary embodiment of the present invention.

The base structure according to embodiments of the present invention is shaped to withstand these various forces. The base structure reduces the need for plastic, yet still enhances the overall structural integrity of the container. Moreover, the base structure has a simplified geometry that allows for easy removal of the substance from the container. To this end, as seen in FIG. 2, the base structure according to an exemplary embodiment has an annular support heel 18. The support heel 18 allows the container 1 to be supported erect on a horizontal surface. The support heel 18 is preferably rounded and forms an annular line of contact with the horizontal surface (not shown).

The annular support heel 18 has an inner and an outer portion, 20 and 22, respectively. The outer portion 22 merges with the container's sidewall 14. The inner portion 20 of the annular support heel 18 has an upwardly inclined surface 24 that forms an inner projecting portion 25. The support heel 18 surrounds the inner projecting portion 25.

Figure 3:
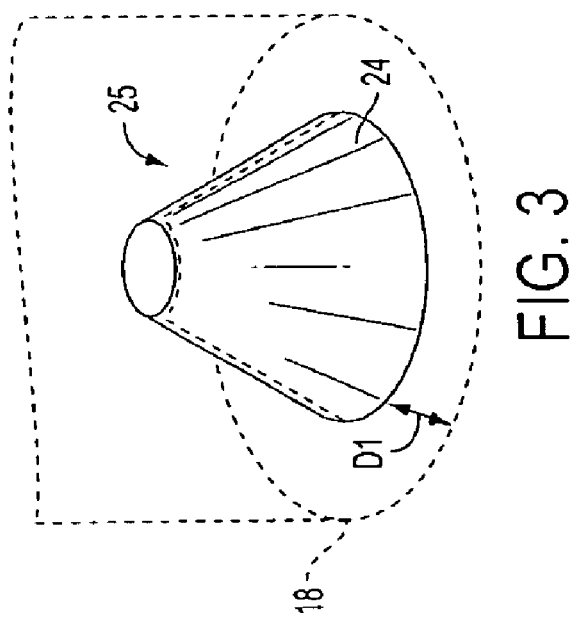
FIG. 3 is a cut-away perspective view of a container including a base structure according to an exemplary embodiment of the present invention.

The inner projecting portion 25 may comprise an inverted cone as shown in FIGS. 2 and 3. Inclined surface 24 forms walls 26 of the inverted cone. Walls 26 are substantially smooth and preferably do not include ribs, recesses or other structural elements formed therein. Walls 26 of the cone are formed in a much stepper angle and are raised up deeper into the container than is done on most traditional push-up bases. This increased height can allow the material used to form the inner projecting portion 25 to stretch down into the base and support heel 18.

An inclination angle of the inner projecting portion 25 is selected to minimize an amorphous ring that inherently appears therein. After a hot fill process, the amorphous ring tends to roll out. However, the increased height and steeper angle of the inverted cone prohibit roll out past the support heel 18 of the container.

Figure 4:
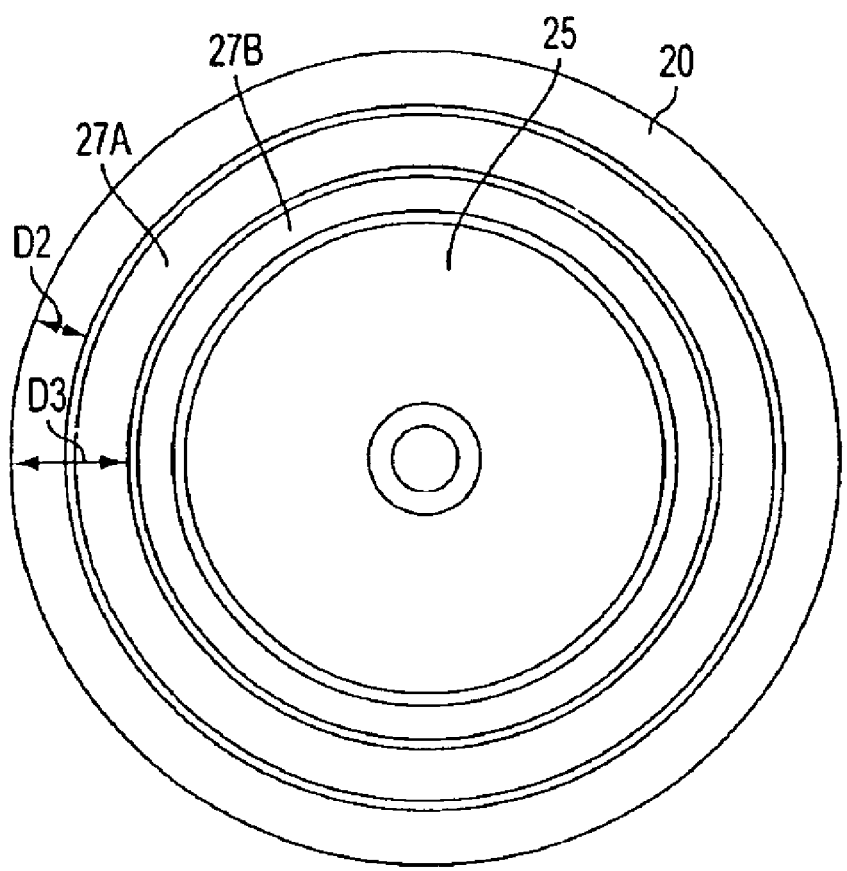
FIG. 4 is a bottom view of a container including a base structure according to an exemplary embodiment of the present invention.

The inner projecting portion 25 is preferably inset from the support heel 18 of the container 1. For example, the inverted cone 25 shown in FIG. 3 is inset a distance D1 from the support heel 18. The amount of inset can depend upon the size of the container, the angle of inclination of the inverted cone, and other production factors. The inset distance D1 between the walls 26 of the inverted cone and the support heel 18 of the container 1 can be utilized to facilitate the stacking of containers on top of each other. This area can be adapted to receive an exterior surface of a cap of a container. For example, as shown in FIG. 4, at least one concentric ring can be formed between the inner projecting portion 25 and the support heel 18. In the embodiment illustrated, two concentric rings 27A, 27B are provided. The concentric rings 27A, 27B typically surround the inner projecting portion 25 and are also inset with respect to the support heel 18. Here ring 27A is inset a distance D2 from support heel 18 and ring 27B is inset a distance D3 from support heel 18. Ring 27A is formed around ring 27B. The concentric rings can have different heights, widths, etc. and can be adapted to receive and mate with the external surface of the cap that is used to seal the container. Accordingly, sealed, capped containers can be stacked on top of each other for easy storage and shipping.

A more detailed view of the base is shown in FIG. 2, which is a cross-section of the base. The inner portion 20 transitions at an inset from the support heel 18 into the inclined surface 24. The inclined surface 24 projects inwardly towards the body 6 of the container 1 to form inner projecting portion 25. The inner projecting portion 25 is adapted to minimize an amorphous ring of material that inherently forms therein. It has been determined experimentally that forming a portion of the base pushed up towards the hollow body 6 at an inclination angle of about 40 degrees or more minimizes the amorphous ring. In the embodiment illustrated in FIG. 4, the inclined surface 24 forms an inverted cone as the inner projecting portion 25. However, the inner projecting portion 25 may take other shapes, for example, a pyramid shape.

In the embodiment shown in FIG. 2, a vertex of the inverted cone extends towards the hollow body 6 of the container 1 and a frustum of the cone is arranged in the vicinity of a plane of the support heel 18. The inner projecting portion 25 preferably has a height H of about 0.2 inches or more as measured from the annular line of contact of the container with a horizontal support surface (not shown). Here, the inverted cone has a height of about 0.85 inches. The particular height of the inner projecting portion is dependent upon the preform used and how it distributes material in the base, the fill temperatures and other processing conditions. The extent to which the inner projecting portion 25 projects towards the body 6 may also contribute to minimizing the size of the amorphous ring and preventing roll out.

The vertex of the cone terminates in a plateau 32. The plateau 32 is typically circular and in this embodiment has a diameter of about 0.4 inches. The plateau 32 may have a substantially flat top surface 34. However, a dimple is typically present in the top surface 34 of the plateau 32. The dimple in the illustrated embodiment is arcuate with a radius of about 0.375 inches. A button formed from excess material is typically present on a bottom surface 36 of the plateau 32, opposite from the dimple. The inner projecting portion 25 is usually centered around the longitudinal axis 100 of the container.

The frustum of the cone opens downwardly away from the body 6 of the container 1. In this embodiment, the opening of the frustum of the cone is circular and has a diameter of about 1.7 inches. The frustum may merge with a concentric ring formed in the base 4 or with the inner portion 20 of the support heel 18.

The inclined surface 24 forms the sides of the cone and extend between the vertex and the frustum. As mention above, the inclined surface 24 of the inner projecting portion 25 is inclined at an angle selected to minimize the size of an amorphous ring of material present therein. The angle is preferably substantially constant along the length of the inclined surface. This interior angle α is measured with respect to a plane that is perpendicular to the longitudinal access of the container and inside the frustum of the cone, as shown in FIG. 4. The inclined surface 24 is preferably inclined at an angle greater than about 40 degrees, and preferably greater than about 50 degrees. A cross-section of the inclined surface 24 is substantially linear.

The inclined surface 24 includes an interior surface 28 facing towards the interior of the container 1 an outer surface 30 facing outside of the container 1. Preferably, at least the interior surface 28 is substantially smooth, that is, the interior surface 28 should not include any ribs, recesses, or other structural elements. The exterior surface 30 of the inclined surface 24 is also preferably smooth. Thus, the inner projecting portion 25 does not include and ribs or other structural elements. This helps to minimize the amount of plastic used to form the base and to simplify the production process. Also, eliminating as much geometry on the interior surfaces of the container as possible aids in removal of a substance from the container. Of course, both the interior and exterior surfaces 28, 30 may include minor surface imperfections and defects that do not have a significant effect on the smoothness of their surfaces.

Accordingly, a base structure for a blow molded container is provided. The base structure comprises a push up portion which does not include any ribs or other structural supports. The geometry of the base structure is simplified and can facilitate the removal of substance from the container. The structure of the push up eliminates unnecessary geometry while still maintaining the structural integrity of the base. Additionally, by eliminating the need for ribs or additional structural members in the base push up, the amount of material needed to form the base structure is reduced and the manufacturing process of the container is simplified.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. For example, the dimensions described above related to a specific embodiment of the invention. Other shapes and sizes of the inner projecting portion are possible within the scope of the invention. It is therefore to be understood that, within the scope of the claims and their equivalents, the invention may be practiced otherwise than as specifically described.

What is claimed is:

1. A base structure for a blow-molded container having a sidewall, comprising:

a support heel having an outer portion and an inner portion, the outer portion merging with the container sidewall;

an inset portion merging with the inner portion of the support heel, the inset including a wall arranged substantially perpendicular with respect to the sidewall; and an inner projecting portion merging with the inset portion, the inner projecting portion being inclined at an angle of greater than about 50 degrees, wherein sides of a cross section of the inner projecting portion are substantially linear and wherein the blow-molded container comprises a material selected from the group consisting of polyethylene terephthalate and polyester.

2. The base structure of claim 1, wherein the inner projecting portion comprises a truncated cone.

3. The base structure of claim 2, wherein the inner projecting portion is surrounded by the support heel.

4. The base structure of claim 2, wherein the truncated cone includes a plateau.

5. The base structure of claim 4, wherein the plateau includes a dimple.

6. The base structure of claim 1, wherein a surface of the inner projecting portion is smooth.

7. The base structure of claim 1, wherein the angle is substantially constant along a length of the inner projecting portion.

8. The base structure of claim 1, wherein the inner projecting portion has a height of more than about 0.25 inches measured from a lowest part of the inner portion.

9. The base structure of claim 1, wherein the inner projecting portion comprises an inner surface and an outer surface.

10. The base structure of claim 9, wherein both the inner surface and the outer surface are substantially smooth.

11. The base structure of claim 1, wherein the inset portion includes at least one concentric ring arranged between the support heel and the inner projection portion, the concentric ring projecting inwardly with respect to the support heel.

12. The base structure of claim 11, wherein the at least one concentric ring is adapted to mate with an outside surface of a cap.

13. A blow-molded container, comprising:

a hollow body portion having a longitudinal axis;

a top portion with a finish extending upwardly from the body portion; and an enclosed base portion including an outer wall merging with the body portion opposite from the top portion and an inner wall merging with the outer wall to form a support surface, the inner wall including a smooth inclined surface offset inwardly from the support surface by a substantially perpendicular portion and projecting inwardly towards the body portion forming an interior angle of at least about 40 degrees with respect to a plane perpendicular to the longitudinal axis, wherein a cross-section of the inclined surface is substantially linear and wherein the blow-molded container comprises a material selected from the group consisting of polyethylene terephthalate and polyester.

14. The container of claim 13, wherein the inclined surface projects at least about 0.2 inches from the support surface.

15. The container of claim 13, wherein the inner wall forms a truncated cone having a plateau.

16. The container of claim 15, wherein the truncated cone is centered around the longitudinal axis.

17. The container of claim 13, wherein the interior angle is constant along the inclined surface.

18. The container of claim 13, wherein the support surface surrounds the inclined surface.

19. The container of claim 18, wherein the substantially perpendicular portion further includes at least one concentric ring formed around the inclined surface.

20. A base structure for a blow-molded container having a sidewall, comprising:

a support heel having an outer portion and an inner portion, the outer portion merging with the container sidewall;

an inset portion merging with the inner portion of the support heel, the inset including a wall arranged substantially perpendicular with respect to the sidewall; and an inner projecting portion merging with the inner portion of the support heel, the inner projecting portion comprising a truncated cone, the cone being formed at an angle with respect to a plane of the support heel adapted to minimize a diameter of an amorphous ring of material formed in the truncated cone, wherein sides of a cross section of the inner projecting portion are substantially linear and wherein the blow-molded container comprises a material selected from the group consisting of polyethylene terephthalate and polyester.

21. The base structure of claim 20, wherein, after hot fill, the amorphous ring does not roll out past the support heel.

22. The base structure of claim 20, wherein the truncated cone does not include any structural elements.

23. The base structure of claim 20, wherein side surfaces of the cone are substantially smooth.

* * * * *